(12) United States Patent
Tong et al.

(10) Patent No.: US 8,395,369 B2
(45) Date of Patent: Mar. 12, 2013

(54) BUCK CONVERTER WITH DELAY CIRCUIT

(75) Inventors: Song-Lin Tong, Shenzhen (CN); Qi-Yan Luo, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 34 days.

(21) Appl. No.: 13/171,648

(22) Filed: Jun. 29, 2011

(65) Prior Publication Data

US 2012/0274292 A1 Nov. 1, 2012

(30) Foreign Application Priority Data

Apr. 26, 2011 (CN) .......................... 2011 1 0104677

(51) Int. Cl.
*G05F 5/00* (2006.01)
*G05F 1/40* (2006.01)

(52) U.S. Cl. .................. 323/299; 323/285; 323/286

(58) Field of Classification Search .................. 323/271, 323/266, 267, 268, 299, 307, 282–286
See application file for complete search history.

(56) References Cited

U.S. PATENT DOCUMENTS

| | | | |
|---|---|---|---|
| 2008/0316195 A1* | 12/2008 | Li et al. | 345/212 |
| 2010/0013450 A1* | 1/2010 | Huang et al. | 323/282 |
| 2010/0117450 A1* | 5/2010 | Azrai et al. | 307/31 |
| 2010/0325464 A1* | 12/2010 | Hu | 713/330 |
| 2011/0156669 A1* | 6/2011 | Ishii | 323/271 |
| 2012/0133409 A1* | 5/2012 | Hsieh | 327/290 |

\* cited by examiner

*Primary Examiner* — Jessica Han
*Assistant Examiner* — Ivan Laboy Andino
(74) *Attorney, Agent, or Firm* — Altis Law Group, Inc.

(57) ABSTRACT

A buck converter includes a power supply unit, two MOSFETs and a delay circuit. The PWM module is coupled to the gates of the two MOSFETs to alternatively turn on the two MOSFETs. The delay circuit is coupled between an output terminal and an input node of the PWM module for making sure that a voltage applied to the PWM module is after a voltage applied to a drain the MOSFETs.

6 Claims, 2 Drawing Sheets

US 8,395,369 B2

BUCK CONVERTER WITH DELAY CIRCUIT

TECHNICAL FIELD

The disclosure generally relates to a buck converter.

DESCRIPTION OF RELATED ART

Buck converters generally include two metal oxide semiconductor field effect transistors (MOSFETs) connected in series. A pulse width modulation (PWM) module provides a driver to gates of the two MOSFETs to alternatively turn on the two MOSFETs. However, at the time of the buck converters being turned on, a voltage applied to a drain of the MOSFETs must be applied before a voltage applied to the PWM module, or else the MOSFETs would be damaged.

Therefore, an improved buck converter is desired to overcome the above described shortcomings

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

An embodiment of the present disclosure will now be described in detail below and with reference to the drawings.

Figure 1:
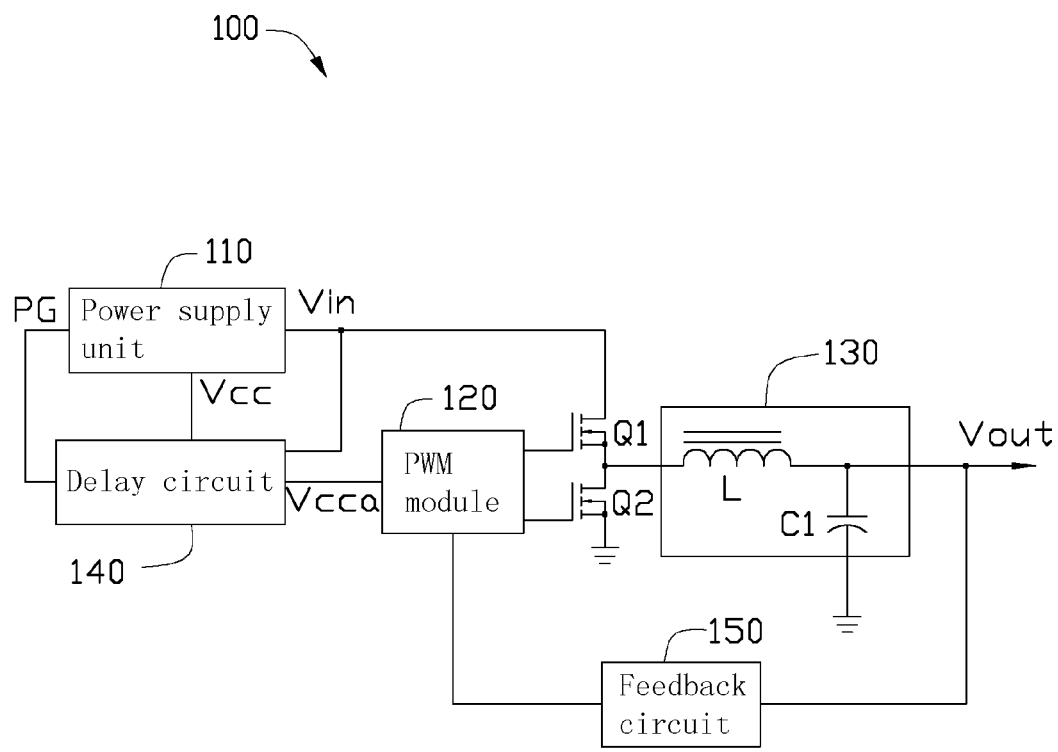
FIG. 1 is an illustrative view for a buck converter in accordance with a first embodiment.

Referring to FIG. 1, a buck converter 100 in accordance with a first embodiment includes a power supply unit 110, a first MOSFET Q1, a second MOSFET Q2, a PWM module 120, a filter circuit 130, a delay circuit 140 and a feedback circuit 150.

The power supply unit 110 includes a first output terminal Vin and a second output terminal Vcc. The first output terminal Vin provides power to the first MOSFET Q1 and the second MOSFET Q2. The second output terminal Vcc provides power to the PWM module 120. The power supply unit 110 further includes a power good terminal PG. The power good terminal PG is used to illustrate whether voltages at the first output terminal Vin and the second output terminal Vcc are at predetermined values. When the voltages at the first output terminal Vin and the second output terminal Vcc are at the predetermined values, the power good terminal PG of the power supply unit 110 will output a high level voltage signal. In this embodiment, the power supply unit 110 outputs a voltage about 12V at the first output terminal Vin and outputs a voltage about 5V at the second output terminal Vcc.

A drain of the first MOSFET Q1 is coupled to the first output terminal Vin and a source of the first MOSFET Q1 is coupled to a drain of the second MOSFET Q2. A source of the second MOSFET Q2 is coupled to the ground. In this embodiment, the first MOSFET Q1 and the second MOSFET Q2 are N-channel normally off device.

The PWM module 120 is coupled to gates of the first MOSFET Q1 and the second MOSFET Q2 to alternatively turn on or turn off the first MOSFET Q1 and the second MOSFET Q2. That is, when the PWM module 120 provides a high level voltage signal to turn on the first MOSFET Q1, a corresponding low level voltage signal is provided to turn off the second MOSFET Q2. Similarly, when the PWM module 120 provides a high level voltage signal to turn on the second MOSFET Q2, a corresponding low level voltage signal is provided to turn off the first MOSFET Q1. The PWM module 120 further includes an input terminal Vcca for accepting power to the PWM module 120.

The filter circuit 130 is coupled between the source of the first MOSFET Q1 and an output node Vout of the buck converter 100 to provide a direct current (DC) voltage at the output node Vout. In this embodiment, the filter circuit 130 includes an inductor L and a first capacitor C1. One terminal of the inductor L is coupled to the source of the first MOSFET Q1, and the other terminal of the inductor L is coupled to the output node Vout. One terminal of the first capacitor C1 is coupled to the output node Vout, and the other terminal of the first capacitor C1 is coupled to the ground.

Figure 2:
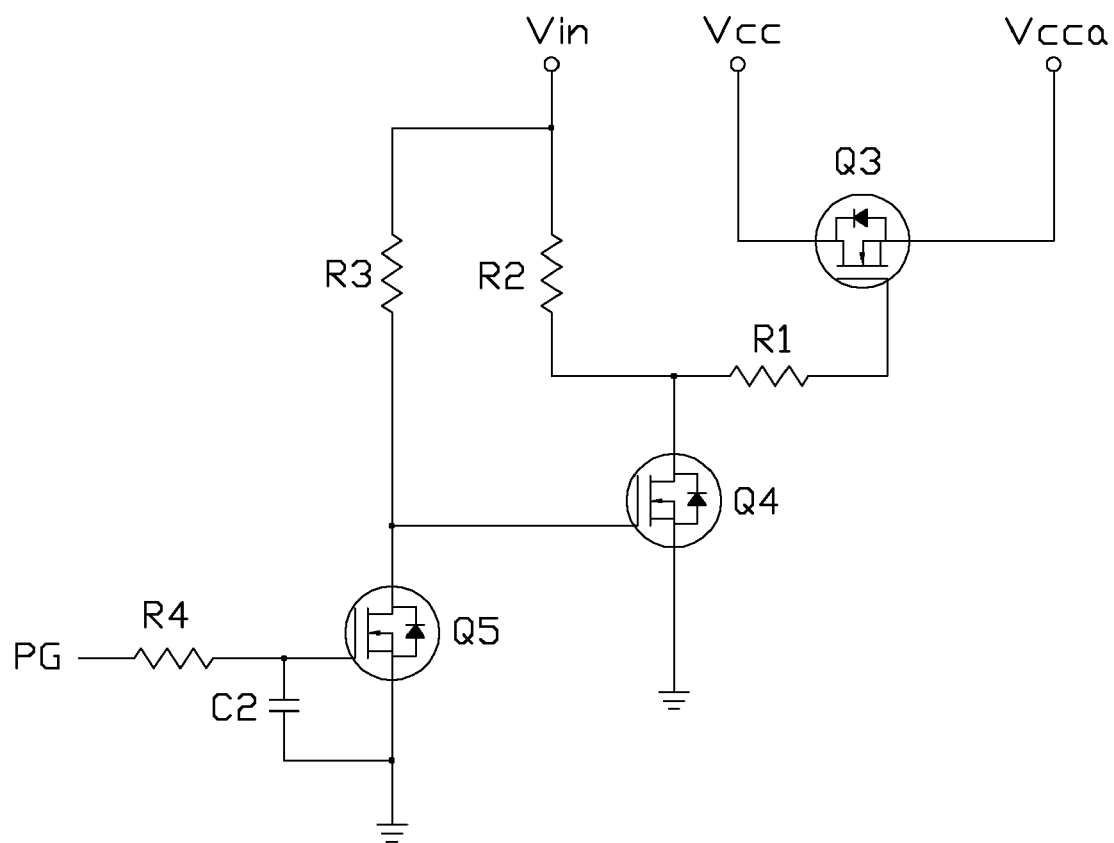
FIG. 2 is an illustrative view for a delay circuit in FIG. 1.

Referring also to FIG. 2, the delay circuit 140 is coupled between the second output terminal Vcc and the input terminal Vcca of the PWM module 120. The delay circuit 140 is used for delaying a voltage applied to the input terminal Vcca of the PWM module 120. Therefore, the voltage applied to the PWM module 120 is after the voltage applied to the drain of the first MOSFET Q1. In this embodiment, the delay circuit 140 includes a third MOSFET Q3, a fourth MOSFET Q4 and a fifth MOSFET Q5. A drain of the third MOSFET Q3 is coupled to the second output terminal Vcca, a source of the third MOSFET Q3 is coupled to the input terminal Vcca of the PWM module 120, and a gate of the third MOSFET Q3 is coupled to a drain of the fourth MOSFET Q4 through a first resistor R1. A source of the fourth MOSFET Q4 is coupled to the ground, a drain of the fourth MOSFET Q4 is coupled to the first output terminal Vin through a second resistor R2, and a gate of the fourth MOSFET Q4 is coupled to a drain of the fifth MOSFET Q5. A source of the fifth MOSFET Q5 is coupled to the ground, a drain of the fifth MOSFET Q5 is coupled to the first output terminal Vin through a third resistor R3, and a gate of the fifth MOSFET Q5 is coupled to the power good terminal PG of the power supply unit 110 through a fourth resistor R4. A second capacitor C2 is coupled between the gate and the drain of the fifth MOSFET Q5. In this embodiment, the third MOSFET Q3, the fourth MOSFET Q4 and the fifth MOSFET Q5 each are N-channel normally off MOSFET. In alternative embodiments, the third MOSFET Q3, the fourth MOSFET Q4 and the fifth MOSFET Q5 can be P-channel normally off MOSFET.

The operation of the delay circuit 140 will be described in following. When the power supply unit 110 is turned on, the power supply unit 110 provides voltages at the first output terminal Vin and the second output terminal Vcc. When the voltages at the first output terminal Vin and the second output terminal Vcc are at the predetermine values, the power supply unit 110 provides a high level voltage signal at the power good terminal PG. The voltage at the power good terminal PG will charge the second capacitor C2 through the fourth resistor R4 and make a voltage at the gate of the fifth MOSFET Q5 increase gradually. When the voltage at the gate of the fifth MOSFET Q5 increases to a threshold voltage of the fifth MOSFET Q5, the fifth MOSFET Q5 turns on and the fourth MOSFET Q4 turns off. Therefore, the voltage at the first output terminal Vin will be directly applied to the gate of the third MOSFET Q3 through the first resistor R1 and the second resistor R2. And then, the third MOSFET Q3 is turned on and the voltage at the second output terminal Vcc can be applied to the input node Vcca of the PWM module 120. In the operating process, a delay time of the delaying circuit 140 is determined by a capacitance of the second capacitor C2 and a resistance of the fourth resistor R4. By changing the capacitance of the second capacitor C2 or the resistance of the fourth resistor R4, the delay time of the delaying circuit 140 can be adjusted. Generally, the delay time of the delaying circuit 140 can be in a range from 100 ms to 200 ms. In alternative embodiments, the fourth resistor R4 can be adjustable to adjust the delay time of the delaying circuit 140.

The buck converter 100 can further include a feedback circuit 150. The feedback circuit 150 is coupled between the output terminal Vout of the buck converter 100 and the PWM module 120. By detecting the output voltage at the output node Vout, the feedback circuit 150 can settle the output voltage at the output node Vout to a constant value.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A buck converter, comprising:
 a power supply unit, having a first output terminal and a second output terminal;
 a first MOSFET comprising a drain coupled to the first output terminal, a gate, and a source;
 a second MOSFET comprising a drain coupled to the source of the first MOSFET, a source coupled to the ground and a gate;
 a PWM module, coupled to the gates of the first MOSFET and the second MOSFET to alternatively turn on the first MOSFET and the second MOSFET, the PWM module having an input terminal;
 a filter circuit, coupled between the source of the first MOSFET and an output node of the buck converter; and
 a delaying circuit, coupled between the second output terminal of the power supply unit and the input terminal of the PWM module for making sure that a voltage applied to the PWM module is after a voltage applied to the drain the first MOSFET;
 wherein power supply unit further comprises a power good terminal, the power good terminal outputs a high level voltage signal when voltages at the first output terminal and the second output terminal come to predetermined values; and
 wherein the delaying circuit comprises a third MOSFET, a fourth MOSFET and a fifth MOSFET, a drain of the third MOSFET is coupled to the second output terminal, a source of the third MOSFET is coupled to the input terminal of the PWM module, and a gate of the third MOSFET is coupled to a drain of the fourth MOSFET Q4 through a first resistor; a source of the fourth MOSFET is coupled to the ground, a drain of the fourth MOSFET is couple to the first output terminal through a second resistor, and a gate of the fourth MOSFET is coupled to a drain of the fifth MOSFET; a source of the fifth MOSFET is coupled to the ground, a drain of the fifth MOSFET is coupled to the first output terminal through a third resistor, and a gate of the fifth MOSFET is coupled to the power good terminal through a fourth resistor; a second capacitor is coupled between the gate and the drain of the fifth MOSFET.

2. The buck converter of claim 1, wherein the filter circuit comprises an inductor and a first capacitor, the inductor is coupled between the source of first MOSFET and the output node of the buck converter, the first capacitor is coupled between the output node of the buck converter and the ground.

3. The buck converter of claim 1, further comprising a feedback circuit coupled between the output node of the buck converter and the PWM module.

4. The buck converter of claim 1, wherein the third MOSFET, the fourth MOSFET and the fifth MOSFET are N-channel normally off MOSFET.

5. The buck converter of claim 1, wherein the fourth resistor is adjustable for adjusting a delay time of the delaying circuit.

6. The buck converter of claim 1, wherein the voltage applied to the PWM module is later than the voltage applied to the drain the first MOSFET in a range from 100ms to 200ms.

* * * * *